Sept. 29, 1936.  G. T. BALFE  2,055,471
LAMINATED MATERIAL
Filed Dec. 23, 1932
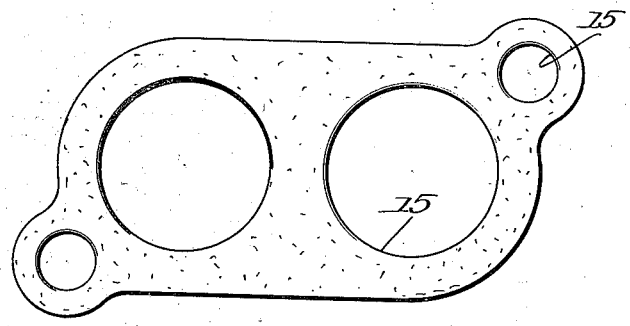
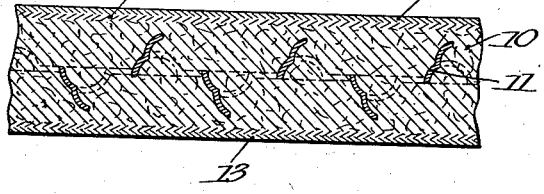
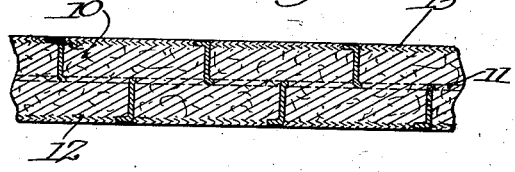
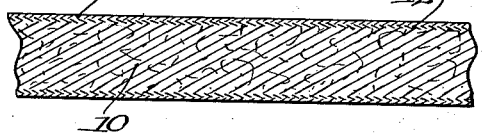
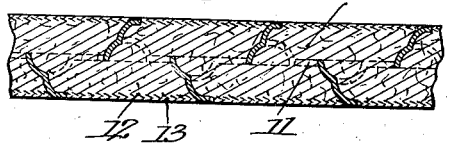
Inventor
George T. Balfe Patented Sept. 29, 1936

2,055,471

UNITED STATES PATENT OFFICE 2,055,471

LAMINATED MATERIAL

George T. Balfe, Detroit, Mich., assignor to Detroit Gasket & Mfg. Co., Detroit, Mich., a corporation of Michigan Application December 23, 1932, Serial No. 648,691

4 Claims. (Cl. 154—45.5)

My invention relates to gasket material and gaskets and a process of manufacture, and is particularly concerned with a laminated product. For example, one layer will consist of fibrous or other compressible material and another of a protective layer. A stratum of a non-sticking agent such as graphite and a metal layer also are preferably employed.

The gaskets are useful in the automotive industry for example in connection with cylinder heads and exhaust outlets, as well as oil, water, and gas connections, and numerous other applications.

An object of the invention is to produce a gasket of increased strength having a relatively hard, tough, outer surface layer or portion which will be resistant to deteriorating influences surrounding the handling incident to packing, storing and shipment of gaskets and which likewise will afford amplified sealing qualities and resistance to blowing, burning and other conditions surrounding the gasket function.

A further object of the invention is to provide a gasket with a protective layer which will be relatively harder than the compressible or fibrous material, but which will be rupturable, i. e., not interfere with the compressibility of the fibrous material.

Another object of the invention is to produce a gasket which will be capable of resisting the action of heat, oil, gases and water, as well as other chemical and physical conditions such as wide variations in temperature and pressure encountered in the application of gaskets.

The invention aims also to produce gasket material and gaskets wherein the fibres at the exposed areas will be thoroughly bonded together to thereby strengthen the gasket against tearing strains due to pressure and render it substantially impervious to gases and liquids.

It is the present practice to provide gaskets having asbestos gasket material layers with a non-sticking layer of graphite or graphite mixture. The present invention has, as its object, to provide a protective layer for said graphite layer, whereby, when the gasket is handled as well as while it is in use, this graphite layer will be preserved in order that it may accomplish its purpose of overcoming the possibility of the gasket sticking to the joint surfaces, for example, metal surfaces. In this connection the superposed protective layer also provides a non-sticking contact surface in addition to maintaining and bonding the graphite layer to the fibrous material.

It is another object of the invention to form the surface with a protective layer which, on drying, will be abrasion resistant and which also will form a sealing skin not only about the exposed faces of the gasket where it protects the graphite layer, but also the exposed edges of the gasket, whereby the fibrous layers are maintained fresh and prevented from drying out in storage and in the case where a metal insert is used, this will be prevented from rusting or oxidizing.

I accomplish these results by producing on the surface and exposed portions and edges of the fibrous material and metal insert where employed, and preferably over the exposed graphite layer and exposed edge portions of the gasket, a layer of silicate of soda, shellac or commercial varnishes such as are adaptable for the purpose. These substances are presented to the gaskets or the sheets from which they are formed, in a liquid or flowable state as by bath treatment, whereby the fibrous material is permeated with the surface layer material and the gasket or sheet entirely sealed or enveloped in the layer forming material. Upon drying I find this material has the functions above ascribed to it and materially adds to the life and effectiveness of the gasket.

A further object of the invention is to provide a gasket wherein the fibrous material layers are permeated with a suitable waterproof adhesive which will be selected to be resistant to all of the various chemical and physical conditions incident to gasket use.

I control the amount of waterproof adhesive incorporated in the fibrous gasket layers and in that manner regulate the extent of permeation and the amount of the material constituting the protective surface layer which will be present in the final gasket or sheet material. By reason of this, the nature and quality of the surface layer can be readily regulated and its thickness varied in accordance with the conditions under which the gasket is to be applied.

Referring to the drawing:

Figure 1 is a top plan view of a gasket having the form shown in my Patent 1,776,140 or my Patent 1,927,450 to which the present invention is applied.

Figures 2, 3 and 4 are sectional views of gaskets illustrated in my said patents having the laminated structure of this invention, and Figure 5 is a view showing a layer of the laminated gasket material in accordance with this invention devoid of a metal layer.

Referring to Figures 2, 3 and 4, the fibrous gasket material layers which are preferably of asbestos are illustrated at 10. The gasket is provided with a metallic insert 11, preferably of sheet steel which in Figs. 2 and 3, has a multiplicity of protuberances and tangs projecting beyond the apex thereof, which tangs are deformed as shown in Fig. 2, but preferably extend through the gasket layers and are deformed and clenched over to lie in the plane of the surface of the gasket as shown in Fig. 3, where they come in contact with the metal or other surfaces of the joint and act as conduits for the transfer of heat. The construction shown in Fig. 4 is similar to that set forth in my Patent 1,927,450, wherein the tangs extend through and are clenched over to lie likewise in the plane of the gasket material and in contact with the surfaces of the joint to act as heat conduits. The projections are closely compacted or spaced over substantially the entire area of the core or insert and preferably extend through the layers of gasket material and have their ends clenched over to be completely in the plane of the outer surface forming a smooth substantially unobstructed contact surface.

The projections in the forms shown in Figures 3 and 4 not only act as metallic paths or heat conduits as described for overcoming the insulating effect of the gasket material, i. e. to dissipate the heat, but of equal importance act as springs. That is to say, the tongue-like projections of metal have a resilient co-efficient amplifying the inherent resiliency of the gasket layers and in this manner the gasket is maintained live. Furthermore, since the springy tangs or projections will resist compression to a greater degree than the asbestos or other gasket material, they will act as a cushion means to limit the compressibility of the gasket as a whole. Thus undue mashing or disruption of the gasket material is prevented, since the projections are closely spaced or compacted and the metal insert is substantially coextensive with the gasket layers.

I preferably incorporate in the asbestos sheets a suitable waterproofing adhesive, as for example those referred to in my Patent 1,928,585 and my Patent 1,788,041, that is oleates, rubber mixtures, stearates, resinates, asphalts and bitumens. In fact, any suitable waterproofing material having the adhesive qualities of these substances and which will withstand the heat and pressure and the action of gases characteristic of the conditions surrounding the use of a gasket may be employed.

The waterproof adhesive will be incorporated in any customary way, and sheet material produced having the form of flat strips or in rolls, comprising asbestos fibres and having a waterproof adhesive incorporated therein.

The surface of the gasket is preferably provided with a layer 12 of non-sticking or lubricating material, such as graphite, graphite mixture, or powdered mica.

It is the province of the present invention to provide the exposed surfaces and edges of the gasket with a hardened surface layer or film 13, that is to say, a layer which will be relatively harder than the compressible fibrous material, but which will be quite thin and rupturable, i. e., will not interfere with the compressibility of the gasket. Such layer, as stated above, will be abrasion resistant and non-sticking and resistant to the various physical and chemical conditions surrounding the use of the gasket, and of particular importance, will act as a binder for the fibres of the asbestos and for the graphite. With these characteristics in mind, I form the surface protective layer or skin from a liquid in which the gasket or the sheet material is immersed and saturated, and which, on drying, imparts the required properties to the gasket and forms the desired lamina and continuous envelop or skin. Such a liquid consists of various adhesive compositions such as silicate of soda or water glass, shellac, lacquer or varnish mixtures which are commercially well known and which are air-drying or can be dried by means of a raised temperature.

By the drying operation, I remove a substantial percentage of the moisture which may be present in the gasket, so that the final product will be completely free from objectionable moisture such as would tend to disrupt the gasket and in some cases promote sticking under high temperatures.

If the gasket material layers have a relatively large percentage of waterproof adhesive and graphite, the permeation by the silicate of soda or other liquid will be reduced. On the other hand, if the gasket material layers have a relatively smaller percentage of waterproof adhesive and graphite, a greater permeation and saturation with the material in the bath will be obtained. In this manner, the surface characteristics of the gasket can be very exactly controlled and the hardness and resistance definitely regulated for the various adaptations of the gasket. Again, the thickness of the surface layer and envelop and hence its relative hardness with respect to the compressible or fibrous material will be regulated.

It will be understood that the layer of graphite, as well as the hardened surface layer, are relatively thin as compared to the thickness of the fibrous gasket material layers, but, of course, the thickness of these respective layers may be varied, as desired.

It is further to be noted that the surface forming material not only acts as a binder for the fibres of the asbestos layers, but also acts as an adhesive to unite the graphite layer to the gasket material. In this connection the relative thickness of the respective graphite and hardened surface layers is such that the graphite layer is not prevented from exerting its function when applied to a joint, nor is the compressibility of the fibrous material substantially interfered with i. e., the film 13 is rupturable. The surface layer, however, forms a protective cover to prevent scraping off or rubbing off of the graphite layer in the handling and shipment of the gasket. In other words, the surface layer preserves the life of the graphite layer at all times without interfering with its function.

Referring to Figure 5, the gasket or asbestos layer 10 is not provided with a metal insert, but is similarly permeated with a waterproof adhesive, and has its surface and/or edges formed with a layer of graphite or graphite mixture 12. When the final product is sheet material, the graphited asbestos is passed through the bath to produce the hardened layer thereon. Where, however, gaskets are to be formed in the operation, the graphited fibrous layer is punched as described and the gaskets passed through the bath to obtain the complete laminated gasket with a hardened surface layer and envelop.

It will be understood that by the immersion or saturating treatment of the gaskets, the exposed edges 15 of the passages or openings and the marginal edge of the gasket will be covered with a layer or film of the surface layer material. In this manner, the exposed edges of metal, asbestos, and graphite, as the case may be, are protected and a complete seal surrounding both the exposed faces and exposed edges of the gasket is provided. This is important in that it preserves the freshness of the gasket and prevents any drying out of the fibres or the adhesive incorporated in the sheet. In other words, the surface layer material constitutes an envelop in addition to possessing the desirable properties outlined.

In forming a surface layer which is smooth and relatively hard as herein described and of a material which permeates the fibre layers and bonds the fibres together, I produce a gasket which will have a greater resistance or imperviousness to the passage of water, oil and gas pressures than has heretofore been obtained. That is to say, the gasket at its surface portions is made substantially impermeable which is highly important to effect a complete seal, and this result is obtained by the presence of the surface layer and by its uniting the adjacent fibres tightly together and filling any pores in the fibrous layers. This is particularly important since where an insert having projections is combined with the gasket layers by pressure, should any fissures develop, these are effectively closed by the surface layer material and the fibres are bonded together and to the projections.

In some cases, I may eliminate the use of a waterproof adhesive and rely upon the incorporation of and thickness of the surface layer forming material to give the gasket structure added strength and resistance.

In addition to asbestos as the compressible gasket material, I also use cork, asbestos mixtures, rubber and paper and in fact various compressible and flexible materials.

I have described the surface layer as comprising an adhesive composition of which there are various types available and this adhesive as stated, binds the graphite to the gasket material layer as well as binds the fibres or components of the gasket material layer together.

Since the layer forming material permeates the graphite as well as the compressible gasket material layer, the surface of the gasket partakes of the nature of a mixture of the adhesive and graphite in which the graphite particles are covered and bonded together and to the compressible layer.

While I have indicated that the surface layer material when dry is hardened, this is relative in that the gasket may be subjected to flexing and compression without cracking the surface layer or destroying its adhesive effect on the fibres or graphite. The permeation with the surface layer material preferably extends for a short distance into the thickness of the compressible material at the exposed surfaces thereof. The surface layer 13 does not interfere with the compressibility of the gasket so that the gasket is free to accommodate itself to the irregularities in the joint surfaces, the said surface layer 13 simply rupturing locally.

I have referred herein to the use of several waterproof adhesives which are incorporated in the fibrous material and which are present in controlled amounts to regulate permeation with the surface layer forming material. In this connection, fillers may be employed in lieu of the waterproof adhesive and mixed with the fibres to control the permeation with the bath material, but I prefer the waterproof adhesives mentioned because they add strength and resistance to the gasket as explained in my aforesaid patent.

Thus I use in some cases for the gasket material 10, treated paper, that is, paper of various types i. e. long or short fibre which has been saturated with glue and glycerine and formaldehyde. Also compressed asbestos sheets wherein rubber is used as a binder for the asbestos, the rubber content being from 10 to 15% with a small percentage of sulphur to obtain a semi-vulcanization and in some cases, a small amount of coloring matter. The asbestos comprises 85% of the sheet.

In addition to these materials I have also used paper-like webs of varying thickness and formed of a mixture of cork and fibres which have been treated with water and oil resistant material such as glue, glycerine and formaldehyde. All of these various sheet materials I find can be united to the insert by the use of a combining pressure which will deform the projections without causing any deterioration of the sheet.

Other gasket materials may be utilized and I have mentioned the various ones herein which have proven highly practical in use.

This application is a continuation in part of my applications Serial No. 632,824, filed September 12, 1932, now abandoned, and Serial No. 506,441, filed January 3, 1931.

I claim:

1. A gasket having a fibrous outer layer with a surface coating of finely divided lubricating material thereon, the particles of which are held together and to the fibers by an exterior rupturable coating of binding material.

2. A gasket having a fibrous outer layer with a surface coating of finely divided lubricating material thereon, the particles of which are held together and to the fibers by an exterior rupturable coating of binding material comprising sodium silicate.

3. A gasket having a fibrous outer layer with a surface coating of finely divided graphite thereon, the particles of which are held together and to the fibers by an exterior rupturable coating of binding material.

4. A gasket having a fibrous outer layer with a surface coating of finely divided graphite thereon, the particles of which are held together and to the fibers by an exterior rupturable coating of binding material comprising sodium silicate.

GEORGE T. BALFE.